United States Patent
Kamatani (10) Patent No.: US 7,649,343 B2
(45) Date of Patent: Jan. 19, 2010

(54) CHARGE CONTROL CIRCUIT, CHARGING DEVICE, AND CONNECTION CHECKING METHOD

(75) Inventor: Tomohiko Kamatani, Hyogo (JP)

(73) Assignee: Ricoh Company, Ltd. (JP)

( * ) Notice: Subject to any disclaimer, the term of this patent is extended or adjusted under 35 U.S.C. 154(b) by 512 days.

(21) Appl. No.: 11/710,900

(22) Filed: Feb. 27, 2007

(65) Prior Publication Data
US 2009/0189572 A1    Jul. 30, 2009

(30) Foreign Application Priority Data
Feb. 28, 2006    (JP)    ............... 2006-052700

(51) Int. Cl.
H02J 7/06    (2006.01)
H02J 7/00    (2006.01)
H02J 7/04    (2006.01)

(52) U.S. Cl. ............... 320/164; 320/160; 320/163; 320/165

(58) Field of Classification Search ........... 320/160, 320/163, 164, 165
See application file for complete search history.

(56) References Cited

U.S. PATENT DOCUMENTS

| | | | |
|---|---|---|---|
| 6,469,475 B2* | 10/2002 | Pawlik | 320/134 |
| 6,930,466 B2* | 8/2005 | Bradley et al. | 320/133 |

FOREIGN PATENT DOCUMENTS

| | | |
|---|---|---|
| JP | 10-225001 | 8/1998 |
| JP | 10-285812 | 10/1998 |
| JP | 2927354 | 5/1999 |
| JP | 3203538 | 6/2001 |
| JP | 2005-253128 | 9/2005 |

* cited by examiner

*Primary Examiner*—Edward Tso
*Assistant Examiner*—Richard V Muralidar
(74) *Attorney, Agent, or Firm*—Dickstein Shapiro LLP (57) ABSTRACT

Electrical connection between a charging device and a secondary battery is checked during a wait time in which a charge mode of the charging device is selected. When the electrical connection is not successfully established, a charge current is not supplied from the charging device to the secondary battery.

20 Claims, 7 Drawing Sheets

CHARGE CONTROL CIRCUIT, CHARGING DEVICE, AND CONNECTION CHECKING METHOD

CROSS-REFERENCE TO RELATED APPLICATIONS

This patent application is based on and claims priority under 35 U.S.C. §119 to Japanese patent application No. 2006-052700 filed on Feb. 28, 2006, in the Japanese Patent Office, the entire contents of which are hereby incorporated by reference.

FIELD OF THE INVENTION

Example embodiments of the present invention relate generally to a charge control circuit for controlling operation of a transistor supplying a charge current to a secondary battery, a charging device incorporating the charge control circuit, and a method of checking electrical connection between the charging device and the secondary battery.

DESCRIPTION OF THE RELATED ART

In order to charge a secondary battery using a charging device, electrical connection between the secondary battery and the charging device may need to be checked periodically during charging operation or before starting the charging operation.

In one example, the electrical connection between the secondary battery and the charging device may be checked by determining whether the secondary battery is mounted using a switch or a temperature sensitive element, for example, as described in the Japanese Patent Application Publication No. 10-258512 or the Japanese Patent No. 2927354. However, this approach fails to directly detect the electrical connection. Further, providing the switch or the temperature sensitive element may increase the overall size or cost of the charging device.

In another example, the electrical connection may be checked by determining whether a charge current supplied to the secondary battery falls within the range defined based on a threshold value used for detecting whether the secondary battery is fully charged, for example, as described in the Japanese Patent No. 3203538. Since defining the range requires at least two threshold values in addition to the threshold value for detecting the full charge, the overall size or cost of the charging device may increase. Further, the Japanese Patent No. 3203538 fails to address the example case in which the secondary battery is in the over discharge state.

In another example, the electrical connection may be checked by detecting a voltage of the secondary battery, which is obtained during the non-charging state when the secondary battery is charged by the intermittent charging method, for example, as described in the Japanese Patent Application Publication No. 10-225001. In order to perform intermittent charging in addition to constant current voltage charging, the additional circuit for intermittent charging is required such that the overall size or cost of the charging device may increase.

SUMMARY

Example embodiments of the present invention provide a charge control circuit, charging device, and/or a connection checking method, capable of checking electrical connection between a charging device and a secondary battery, without substantially increasing the overall size or cost of the charging device.

In one example, the charge control circuit controls charging operation of a transistor that supplies a charge current to the secondary battery. The charge control circuit may include a battery connector terminal, a charge current detector, a voltage comparator, and a controller. The battery connector terminal electrically connects the charge control circuit with the secondary battery. The charge current detector detects a value of the charge current supplied from the transistor to the secondary battery. The voltage comparator detects a value of the battery voltage at the battery connector terminal and compares the value of the battery voltage with a reference voltage value to generate a comparison result. The reference voltage value may include a first reference voltage value, a second reference voltage value, and/or a third reference voltage value. The controller, which may be coupled to the battery connector terminal, the charge current detector, and the voltage comparator, turns off the transistor before starting the charging operation, starts a charge start wait time after the transistor is turned off while keeping the off state of the transistor, determines whether the value of the battery voltage during the charge start wait time is equal to or greater than the first reference voltage value based on the comparison result to generate a first determination result, and controls the on or off state of the transistor after the charge start wait time according to the first determination result.

Additionally, the controller may determine whether the value of the battery voltage during the charge start wait time is equal to or greater than the second reference voltage value based on the comparison result to generate a second determination result, and control the value of the charge current during the charging operation performed after the charge start wait time according to the second determination result.

Additionally, the controller may further determine whether the value of the battery voltage reaches the second reference voltage value during the charging operation when the second determination result indicates that the value of the battery voltage during the charge start wait time is less than the second reference voltage value, start a fast charge start wait time after the controller determines that the value of the battery voltage reaches the second reference voltage value, determine whether the value of the battery voltage during the fast charge start wait time is equal to or greater than the third reference voltage value based on the comparison result to generate a third determination result, and control the on or off state of the transistor after the fast charge start wait time according to the third determination result.

Additionally, the controller may further reduce the value of the charge current after the value of the battery voltage reaches the third reference voltage value during the charging operation, start a charge end wait time after the value of the charge current reaches below a reference current value, determine whether the value of the charge current during the charge end wait time is equal to or greater than a first current value based on the comparison result to generate a fourth determination result, and control the on or off state of the transistor after the charge end wait time according to the fourth determination result.

Additionally, the controller may further start a recharge start wait time before a recharging operation while keeping the off state of the transistor when the value of the battery voltage reaches below the third reference voltage value, determine whether the value of the battery voltage during the recharge start wait time is equal to or greater than at least one of the first reference voltage value and the second reference voltage value based on the comparison result to generate a fifth determination result, and control the on or off state of the transistor after the recharge start wait time according to the fifth determination result.

Other example embodiments of the present invention provide a charge control circuit, a charging device, and a connection checking method of checking electrical connection between a charging device and a secondary battery, without substantially increasing the work or time required for manufacturing or modifying the charging device.

In one example, electrical connection between the charging device and the secondary battery may be checked during a wait time in which a charge mode of the charging device is changed. Any number of wait time may be selected from a plurality of wait time including a charge start wait time, a fast charge start wait time, a charge end wait time, and a recharge start wait time, during the manufacturing process of the charge control circuit or according to an external signal input to the charge control circuit. Further, a value of any one of the charge start wait time, fast charge start wait time, charge end wait time, and recharge start wait time may be determined during the manufacturing process or according to the external signal input to the charging device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Figure 1:
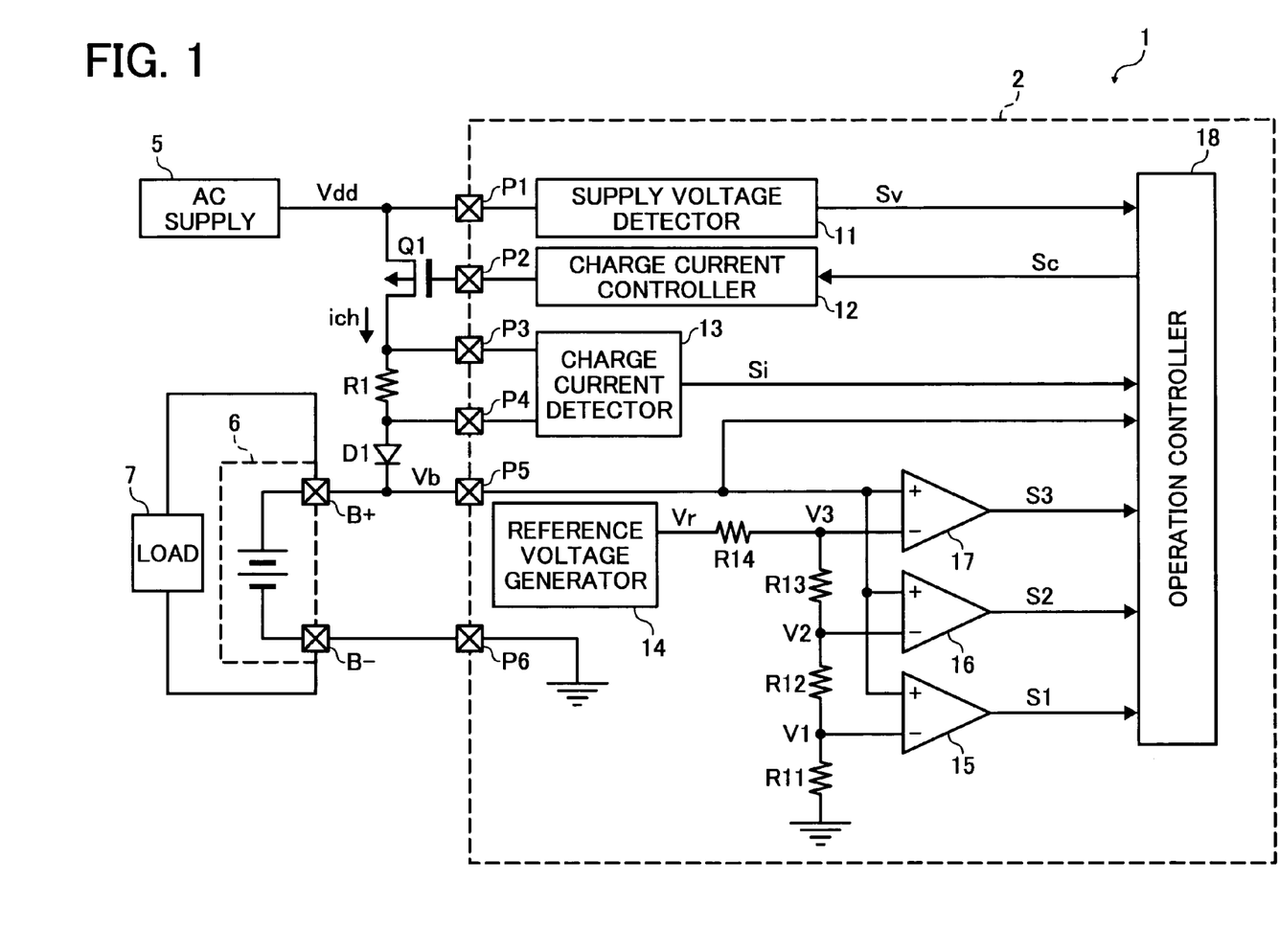
FIG. 1 is a schematic circuit diagram illustrating the structure of a charging device according to an example embodiment of the present invention.

Referring now to the drawings, wherein like reference numerals designate identical or corresponding parts throughout the several views, FIG. 1 illustrates a charging device 1 according to an example embodiment of the present invention. Referring to FIG. 1, the charging device 1 is coupled to an alternate current power supply ("AC supply") 5, which supplies electric power to the charging device 1, such as an AC adopter. The charging device 1 is further coupled to a secondary battery 6 such as lithium ion battery, and further to a load 7 via the secondary battery 6. When the secondary battery 6, which is removable, is connected to the charging device 1, the charging device 1 charges the secondary battery 6 using the constant current voltage charging method.

Still referring to FIG. 1, the charging device 1 includes a power transistor Q1, a resistor R1, a diode D1, and a charge control circuit 2. The power transistor Q1, which may be implemented by a PMOS transistor, supplies an electric charge current ich to the secondary battery 6 according to a current control signal input by the charge control circuit 2 through the base of the power transistor Q1. The resistor R1 detects the value of the charge current ich supplied from the power transistor Q1 to the secondary battery 6. The diode D1 prevents the charge current ich from flowing back to the AC supply 5. The charge control circuit 2 outputs the current control signal, which controls the on or off state of the power transistor Q1 or the value of the charge current ich to be supplied by the power transistor Q1 according to a charge mode of the charging device 1. The current control signal may be generated based on the value of the battery voltage Vb of the secondary battery 6, and/or the value of the charge current ich that may be detected from the voltage across the resistor R1.

The charge control circuit 2 may be implemented by an integrated circuit, which includes an AC supply connector terminal P1, a control signal output terminal P2, a first current detector terminal P3, a second current detector terminal P4, a battery connecter terminal P5, and a ground terminal P6. The AC supply connector terminal P1 is connected to the AC supply 5. The control signal output terminal P2 is connected to the base of the power transistor Q1. The first current detector terminal P3 is connected to one end of the resistor R1. The second current detector terminal P4 is connected to the other end of the resistor R1. The battery connector terminal P5 is connected to the positive terminal Bp of the secondary battery 6. The ground terminal 6 is connected to the ground at one end and to the negative terminal Bn of the secondary battery 6 at the other end.

The charge control circuit 2 further includes a supply voltage detector 11, a charge current controller 12, a charge current detector 13, a reference voltage generator 14, a first comparator 15, a second comparator 16, and a third comparator 17, a plurality of resistors R1 to R14, and an operation controller 18.

The supply voltage detector 11 detects whether the power supply is input from the AC supply 5 by detecting the value of the supply voltage Vdd supplied from the AC supply 5. The charge current detector 13 detects the value of the charge current ich based on the value of the voltage across the resistor R1.

The charge current controller 12 controls operation of the power transistor Q1, by generating the current control signal based on an operation control signal Sc input by the operation controller 18. The operation controller 18 controls operation of the charge control circuit 12 by outputting the operation control signal Sc. In this example, the charge current controller 12 and the operation controller 18 may be collectively referred to as a controller.

The reference voltage generator 14 outputs a reference voltage Vr having a reference value. Based on the reference voltage Vr, a first voltage V1, a second voltage V2, and a third voltage V3 are generated and respectively output to the first comparator 15, the second comparator 16, and the third comparator 15. In this example, the reference voltage generator 14, the first to third comparators 15 to 17, and the resistors R11 to R14 may collectively referred to as a voltage comparator.

In operation, the AC supply 5 inputs the supply voltage Vdd to the supply voltage detector 11 through the AC supply connector terminal P1, and to the source of the power transistor Q1. The gate of the power transistor Q1 is coupled to the charge current controller 12 through the control signal output terminal P2. The supply voltage detector 11 outputs a supply voltage signal Sv to the operation controller 18, when the supply voltage Vdd detected at the AC connector terminal P1 reaches a reference voltage value. Upon receiving the supply voltage signal Sv, the operation controller 18 determines that the power supply is input from the AC supply 5. The charge current controller 12 outputs the current control signal to the gate of the power transistor Q1 through the control signal output terminal 2, according to the operation control signal Sc input by the operation controller 12.

The drain of the power transistor Q1 is connected to the anode of the diode D1 via the resistor R1. The cathode of the diode D1 is connected to the positive terminal Bp and the battery connector terminal P5, respectively. The drain of the power transistor Q1 is further connected to the first current detector terminal P3. The resistor R1 is provided between the first current detector terminal P3 and the second current detector terminal P4. The charge current detector 13 detects the value of the charge current ich, which is obtainable from the voltage across the resistor R1 detected at the first current detector terminal P3 and the second current detector terminal P4. The charge current detector 13 then outputs a current value signal Si having information regarding the detected current value of the charge current ich to the operation controller 18.

The resistors R11 to R14 are connected in series between the reference voltage generator 14 and the ground. The first voltage V1 detected at the connecting point at which the resistor R11 and the resistor R12 are connected is input to an inverse input terminal of the first comparator 15. The second voltage V2 detected at the connecting point at which the resistor R12 and the resistor R13 are connected is input to an inverse input terminal of the second comparator 16. The third voltage V3 detected at the connecting point at which the resistor R13 and resistor R14 are connected is input to an inverse input terminal of the third comparator 17. The battery voltage Vb detected at the battery connector terminal P5 is input to the input terminal of each one of the first, second, and third comparators 15, 16, and 17. The first comparator 15 compares the battery voltage Vb with the first voltage, V1 to output a first voltage signal S1 to the operation controller 18 through the output terminal. The second comparator 16 compares the battery voltage Vb with the second voltage V2 to output a second voltage signal S2 to the operation controller 18 through the output terminal. The third comparator 17 compares the battery voltage Vb with the third voltage V3 to output a third voltage signal S3 to the operation controller 18 through the output terminal.

Figure 2A:
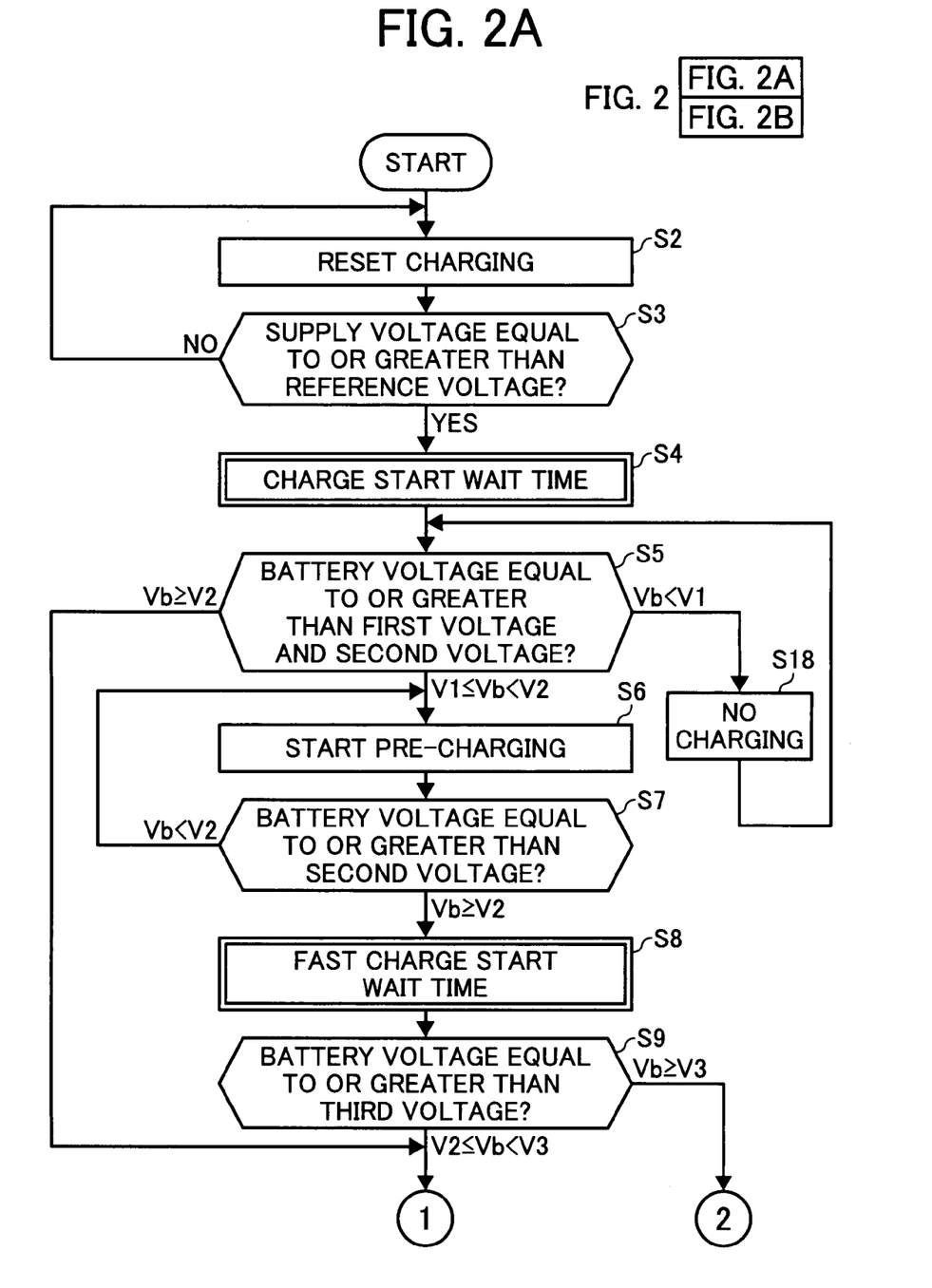
FIGS. 2A and 2B are a flowchart illustrating operation of checking electrical connection between the charging device shown in FIG. 1 and a secondary battery, performed by the charging device shown in FIG. 1, according to an example embodiment of the present invention.
Figure 2B:
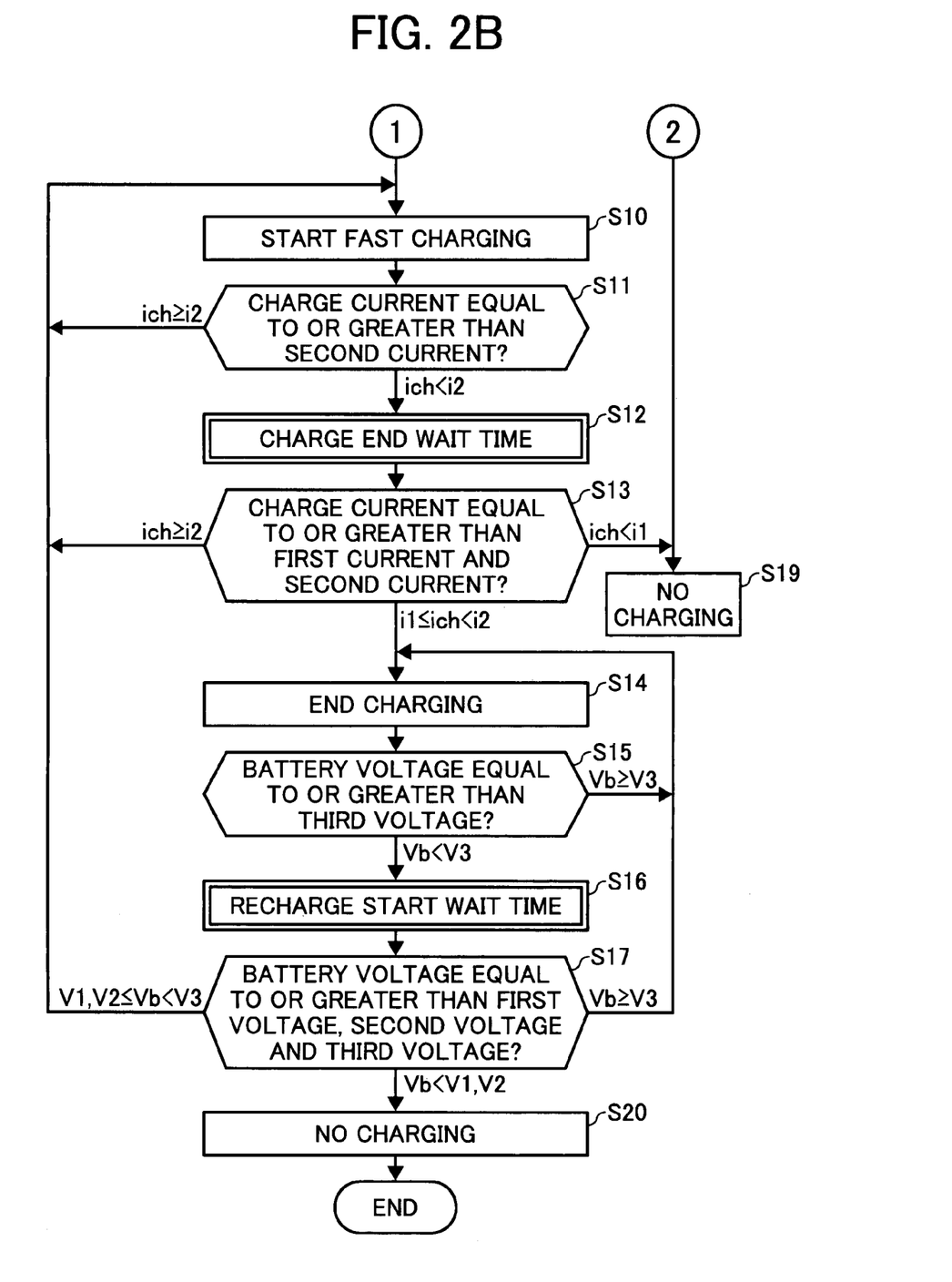

In this example, the first voltage V1, the second voltage V2, and the third voltage V3 respectively correspond to a first reference voltage value, a second reference voltage value, and a third reference voltage value. Further, the first reference voltage value is set smaller than any one of the second reference voltage value and the third reference voltage value. The third reference voltage value is set larger than any one of the first reference voltage value and the second reference voltage value. As described below referring to FIGS. 2 and 3, the first voltage V1 may be set to the minimum voltage value in which the secondary battery 6 is charged under the pre-charge mode. The second voltage V2 may be set to the minimum voltage value in which the secondary battery 6 is charged under the fast charge mode. The third voltage V3 may be set to the voltage value in which the secondary battery 6 is fully charged.

The first comparator 15 compares between the battery voltage Vb and the first voltage V1 to output a first comparison result. When the first comparison result indicates that the battery voltage Vb is equal to or greater than the first voltage V1, the first comparator 15 outputs the first voltage signal S1 having the high level. When the first comparison result indicates that the battery voltage Vb is less than the first voltage V1, the first comparator 15 outputs the first voltage signal S1 having the low level.

The second comparator 16 compares between the battery voltage Vb and the second voltage V2 to output a second comparison result. When the second comparison result indicates that the battery voltage Vb is equal to or greater than the second voltage V2, the second comparator 16 outputs the second voltage signal S2 having the high level. When the second comparison result indicates that the battery voltage Vb is less than the second voltage V2, the second comparator 16 outputs the second voltage signal S2 having the low level.

The third comparator 17 compares between the battery voltage Vb and the third voltage V3 to output a third comparison result. When the third comparison result indicates that the battery voltage Vb is equal to or greater than the third voltage V3, the third comparator 17 outputs the third voltage signal S3 having the high level. When the third comparison result indicates that the battery voltage Vb is less than the third voltage V3, the third comparator 17 outputs the third voltage signal S3 having the low level.

The operation controller 18, which may be implemented by a logical circuit, selects a charge mode based on information obtained from at least one of the supply voltage signal Sv output from the supply voltage detector 11, the current value signal Si output from the charge current controller 12, the first voltage signal S1 output from the first comparator 15, the second voltage signal S2 output from the second comparator 16, and the third voltage signal S3 output from the third comparator 17. Based on the selected charge mode, the operation controller 18 outputs the operation control signal Sc to control the charging operation through the charge current controller 12, including the on or off state of the transistor or the value of charge current ich.

Figure 3:
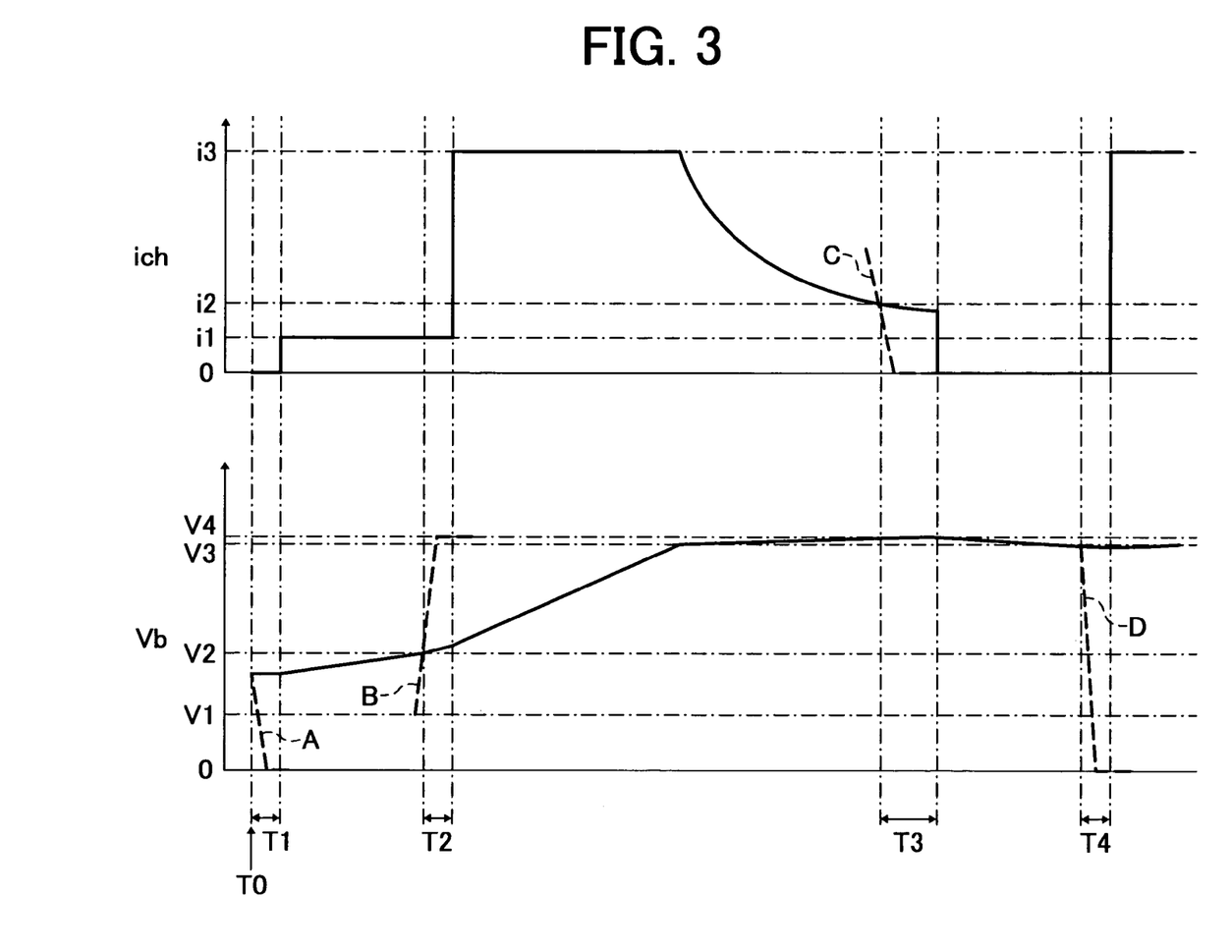
FIG. 3 is a timing chart illustrating the value of a charge current and the value of a battery voltage detected by the charging device shown in FIG. 1, according to an example embodiment of the present invention.

Referring now to FIGS. 2A, 2B and 3, operation of checking electrical connection between the charging device 1 and the secondary battery 6, performed by the charging device 1, is explained according to an example embodiment of the present invention. The operation of FIGS. 2A and 2B may be performed by the operation controller 18 when the charging device 1 is connected to the secondary battery 6 through the battery connector terminal 6.

Referring to FIG. 2A, at S2, the operation controller 18 causes the charge current controller 12 to turn off the power transistor Q1 to reset the charging operation.

S3 determines whether the supply voltage Vdd, which is detected by the supply voltage detector 11, is equal to or greater than the reference voltage value based on the supply voltage signal Sv output from the supply voltage detector 11. When the supply voltage signal Sv indicates that the supply voltage Vdd is less than the reference voltage value ("NO" at S3), the operation returns to S2 to keep the off state of the power transistor Q1 such that charging is not performed. When the supply voltage signal Sv indicates that the supply voltage Vdd is equal to or greater than the reference voltage value ("YES" at S3), the operation proceeds to S4.

S4 waits for a predetermined time period, which may be refereed to as a charge start wait time T1 (FIG. 3), before starting the charging operation. During the charge start wait time T1, the power transistor Q1 is kept turned off such that the charge current ich is not supplied to the second battery 6. In this example, the charge start wait time T1 may be set to a few seconds.

During the charge start wait time T1, the operation controller 18 determines whether to operate a pre-charge mode or a fast charge mode based on the second voltage signal S2. Further, during the charge start wait time T1, the operation controller 18 checks electrical connection between the charging device 1 and the secondary battery 6 based on the first voltage signal S1.

Specifically, at S5, the operation controller 18 determines whether the first voltage signal S1 and the second voltage signal S2 indicate that the battery voltage Vb is equal to or greater than the first voltage V1, and/or equal to or greater than the second voltage V2. When the first voltage signal S1 has the low level, the operation controller 18 determines that the battery voltage Vb is less than the first voltage V1 ("Vb<V1" at S5), and the operation proceeds to S18. When the first voltage signal S1 has the high level and the second voltage signal S2 has the low level, the operation controller 18 determines that the battery voltage Vb is equal to or greater than the first voltage V1 but less than the second voltage V2 ("V1≦Vb<V2"), and the operation proceeds to S6. When the second voltage signal S2 has the high level, the operation controller 18 determines that the battery voltage Vb is equal to or greater than the second voltage V2 ("Vb≧V2"), and the operation proceeds to S10.

At S18, the operation controller 18 determines that the secondary battery 6 is disconnected or the secondary battery 6 does not operate normally. When the charge start wait time T1 passes, the operation returns to S5. In this manner, the off state of the power transistor Q1 is kept even after the charge start wait time T1 passes.

At S6, the operation controller 18 outputs the operation control signal Sc, which causes the charge current controller 12 to set the value of the charge current ich to a first current value i1 (FIG. 3) that corresponds to the pre-charge mode. In this example, the first current value may be set about 10 mA or more. In this manner, the secondary battery 6, which may be in the over discharge state, can be protected from excessive heat or generation of fire.

When the second voltage signal S2 has the high level at S5, the operation controller 18 performs S10 to output the current control signal Sc, which causes the charge current controller 12 to set the value of the charge current ich to a third current value i3 (FIG. 3) that corresponds to the fast charge mode. In this example, the third current value i3 is made greater than the first current value i1.

During the pre-charge mode in which the secondary battery 6 is charged with the first current i1, the operation controller 18 performs S7 to determine whether the battery voltage Vb is equal to or greater than the second voltage V2 based on the second voltage signal S2. When the second voltage signal S2 is changed from the low level to the high level, the operation controller 18 determines that the battery voltage Vb is equal to or greater than the second voltage V2 ("Vb≧V2" at S7), and the operation proceeds to S8. When the second voltage signal S2 has the low level, the operation controller 18 determines that the battery voltage Vb is less than the second voltage V2 ("Vb<V2" at S7), and the operation returns to S6 to continue charging under the pre-charge mode.

For example, referring to FIG. 3, when the secondary battery 6 is not electrically connected, or the secondary battery 6 is not normally operated such as due to the short circuit, the battery voltage Vb may rapidly decrease as indicated by the dashed line A even when the battery voltage Vb has the value greater than the first voltage V1 when the transistor Q1 reset at the start time T0. Accordingly, the battery voltage Vb may reach almost 0 V during the charge start wait time T1. Based on this observation, at S5, the operation controller 18 determines that the secondary battery 6 is not electrically connected or not normally operated when the first voltage signal S1 has the low level during the charge start wait time T1, and performs no charging.

In another example, referring to FIG. 3, when the secondary battery 6 is electrically connected, or the secondary battery 6 normally operates, the battery voltage Vb has the value equal to or greater than the first voltage V1 as indicated by the solid line in FIG. 3. The operation controller 18 may further determine whether to charge the secondary battery 6 under the pre-charge mode or the fast charge mode. Since the battery voltage Vb detected during the charge start wait time T1, which is indicated by the solid line of FIG. 3, ranges between the first voltage V1 and the second voltage V2, the operation controller 18 proceeds to S6 to charge the secondary battery 6 under the pre-charge mode. When the battery voltage Vb reaches the second voltage V2, a fast charge start wait time T2 described below is started before changing from the pre-charge mode to the fast charge mode.

Referring back to FIG. 2A, at S8, the operation controller 18 waits for a predetermined time period, which may be referred to as the fast charge start wait time T2 (FIG. 3), before switching from the pre-charge mode to the fast charge mode. During the fast charge start wait time T2, the power transistor Q1 is caused to continue to output the first current i1 (FIG. 3). In this example, the fast charge start wait time T2 may be set to a few seconds.

Further, during the fast charge start wait time T2, the operation controller 18 checks electrical connection between the charging device 1 and the secondary battery 6 based on the third voltage signal S3.

Specifically, at S9, the operation controller 18 determines whether the third voltage signal S3 indicates that the battery voltage Vb is equal to or greater than the third voltage V3. When the third voltage signal S3 has the low level, the operation controller 18 determines that the battery voltage Vb is equal to or greater than the second voltage V2 but less than the third voltage V3 ("V2≦Vb<V3" at S9), and the operation proceeds to S10. When the third voltage signal S3 has the high level, the operation controller 18 determines that the battery voltage Vb is equal to or greater than the third voltage V3, and the operation proceeds to S19 of FIG. 2B.

At S10, the operation controller 18 outputs the operation control signal Sc, which causes the charge current controller 12 to set the value of the charge current ich to the third current value i3 that corresponds to the fast charge mode. Referring to FIG. 3, under the fast charge mode, the secondary battery 6 is charged with the third current value i3. Once the battery voltage Vb reaches the third voltage V3, the value of the charge current ich gradually decreases such that the battery voltage Vb is kept at the third voltage value V3.

In order to determine whether charging is completed, the operation controller 18 may perform S11 to determine whether the charge current ich is equal to or greater than a second current i2. When the charge current ich is equal to or greater than the second current i2 (ich≧i2), the operation returns to S10 to continue charging. When the charge current ich is less than the second current i2 (ich<i2), the operation proceeds to S12 to start a charge end wait time before changing the charge mode from the fast charge mode to a full charge mode. In this example, the second current i2 corresponds to the value of the charge current that corresponds to the full charge state of the secondary battery 6.

At S19, the operation controller 18 determines that the secondary battery 6 is disconnected, and causes the charge current controller 12 to turn off the power transistor Q1 to stop charging.

For example, referring to FIG. 3, when the secondary battery 6 is disconnected, the battery voltage Vb may rapidly increase as indicated by the dashed line B such that the battery voltage Vb exceeds the third voltage V3, and further reaches a fourth voltage V4, during the fast charge start wait time T2. In this example, the fourth voltage V4 corresponds to the maximum voltage value when the secondary battery 6 is charged under the pre-charge mode. Based on this observation, at S9, the operation controller 18 determines that the secondary battery 6 is disconnected when the third voltage signal S3 has the high level during the fast charge start wait time T2, and performs no charging.

In another example, referring to FIG. 3, when the secondary battery 6 is electrically connected, the battery voltage Vb gradually increases during the fast charge start wait time T2 as indicated by the solid line. Based on this observation, at S9, the operation controller 18 determines that the secondary battery 6 is connected when the third voltage signal S3 has the low level during the fast charge start wait time T2, and continues charging until the charge current ich reaches below the second current i2 such that the charge end wait time T3 descried below is started.

Referring to FIG. 2B, at S12, the operation controller 18 waits for a predetermined time period, which may be referred to as the charge end wait time T3 (FIG. 3), before ending the charging operation. During the charge end wait time T3, the power transistor Q1 is caused to continue to output the charge current ich having the value around the second current i2. In this example, the charge end wait time T3 may be set to a few seconds.

Further, during the charge end wait time T3, the operation controller 18 checks electrical connection between the charging device 1 and the secondary battery 6 based on the current value signal Si.

Specifically, at S13, the operation controller 18 determines whether the current value signal Si indicates that the charge current ich is equal to or greater than the first current i1, and/or equal to or greater than the second current i2. When the charge current ich is less than the first current i1 ("ich<i1" at S13), the operation controller 18 determines that the secondary battery 6 is disconnected, and the operation proceeds to S19 to cause the charge current controller 12 to turn off the power transistor Q1 to stop charging. When the charge current ich is equal to or greater than the first current i1 but less than the second current i2 ("i1≦ich<i2" at S13), the operation controller 18 determines that the secondary battery 6 is fully charged, and operation proceeds to S14 to end the charging operation. When the charge current ich is equal to or greater than the second current ("ich≧i2" at S13), the operation controller 18 determines that the secondary battery 6 is not fully charged, and the operation returns to S10 to continue charging under the fast charge mode.

For example, referring to FIG. 3, when the secondary battery 6 is disconnected, the charge current ich may rapidly decrease during the charge end wait time T3 as indicated by the dashed line C such that the charge current ich reaches below the first current i1. Based on this observation, at S13, the operation controller 18 determines that the secondary battery 6 is disconnected when the current value signal Si indicates that the charge current ich is less than the first current i1, and performs no charging.

In another example, referring to FIG. 3, when the secondary battery 6 is connected, the charge current ich gradually decreases as indicated by the solid line during the charge end wait time T3 until the charge current ich becomes less than the second current i2. Based on this observation, at S13, the operation controller 18 determines that the secondary battery 6 is fully charged when the current value signal Si indicates that the charge current ich is less than the second current i2 but greater than the first current i1, and ends the charging operation.

Further, after ending the charging operation at S14 of FIG. 2B, at S15, the operation controller 18 checks whether the battery voltage Vb is equal to or greater than the third voltage V3, for example, by checking the third voltage signal S3. When the third voltage signal S3 has the high level, the operation controller 18 determines that the battery voltage Vb is equal to or greater than the third voltage V3 ("Vb≧V3" at S15), and the operation returns to S14 to keep the off state of the transistor Q1. When the third voltage signal S3 has the low level, the operation controller 18 determines that the battery voltage Vb is less than the third voltage V3 ("Vb<V3" at S15), and the operation proceeds to S16 to start a recharge start wait time T4 described below and further to S16 to start the recharging operation, or changing the charge mode from the full charge mode to the recharge mode, to keep the battery voltage Vb at the constant voltage level.

At S16, the operation controller 18 waits for a predetermined time period, which may be referred to as the recharge end wait time T4, before starting the recharging operation. During the recharge start wait time T4, the power transistor Q1 is turned off such that the charge current ich is not supplied to the secondary battery 6. In this example, the recharge start wait time T4 may be set to a few seconds. Preferably, the recharge start wait time T4 may be set equal to the charge start wait time T1.

Further, during the recharge start wait time T4, the operation controller 18 checks electrical connection between the charging device 1 and the secondary battery 6 based on any one of the first voltage signal S1 and second voltage signal S2, and third voltage signal S3.

Specifically, at S17, the operation controller 18 determines whether any one of the first voltage signal S1 and second voltage signal S2, and the third voltage signal S3 indicate that the battery voltage Vb is equal to or greater than the first voltage or second voltage, and/or equal to or greater than the third voltage. When the third voltage signal S3 has the high level, the operation controller 18 determines that the battery voltage Vb is equal to or greater than the third voltage V3 ("Vb≧V3" at S17), and the operation returns to S14 to keep the off state of the transistor Q1. When the third voltage signal S3 has the low level, and a selected one of the first voltage signal S1 and the second voltage signal S2 has the high level, the operation controller 18 determines that the battery voltage Vb is less than the third voltage V3 but equal to or greater than the selected one of the first voltage V1 and the second voltage V2 ("V1, V2≦Vb<V3" at S17), and the operation returns to S10 to start charging under the fast charge mode. When the third voltage signal S3 has the low level, and the selected one of the first voltage signal S1 and the second voltage signal S2 has the low level, the operation controller 18 determines that the battery voltage Vb is less than the corresponding one of the first voltage V1 and the second voltage V2, and the operation proceeds to S20 to cause the charge current controller 12 to turn off the power transistor Q1 such that the charge current ich is not supplied to the secondary battery 6.

For example, referring to FIG. 3, when the secondary battery 6 is disconnected, the battery voltage Vb may rapidly decrease during the recharge start wait time T4 as indicated by the dashed line D such that the battery voltage Vb reaches below the second voltage V2, and further below the first voltage V1. Based on this observation, at S17, the operation controller 18 determines that the secondary battery 6 is disconnected when a selected one of the first and second voltage signals S1 and S2 indicates that the battery voltage Vb is less than the corresponding one of the first voltage V1 and second voltage V2, and performs no charging.

In this example, whether to select which one of the first and second voltage signals S1 and S2, or whether to select which one of the first and second voltages V1 and V2, may be determined based on the rate of change in battery voltage Vb when the secondary battery 6 is disconnected, and/or a time period of the recharge start wait time T4. For example, when the rate of change in battery voltage Vb is relatively small or when the recharge start wait time T4 is relatively short, the battery voltage Vb is not most likely reaches below the second voltage V2 during the recharge start wait time T4. In such case, the second voltage signal S2 may be used to determine whether to start the recharging operation or keep the non-charging state. In another example, when the rate of change in battery voltage Vb is relatively large or when the recharge start wait time T4 is relatively long, the battery voltage Vb is most likely reaches below the second voltage V2 during the recharge start wait time T4. In such case, the first voltage signal S1 may be used to determine whether to start the recharging operation or keep the non-charging state.

In another example, referring to FIG. 3, when the secondary battery 6 is connected, the battery voltage Vb gradually decreases during the recharge start wait time T4 as indicated by the solid line. Based on this observation, at S17, the operation controller 18 determines to perform the recharging operation when the third voltage signal S3 indicates that the battery voltage Vb is less than the third voltage V3.

The operation of FIGS. 2A and 2B may be performed in various other ways. For example, in alternative to proceeding S20 from S17 when the battery voltage Vb is less than the selected one of the first voltage V1 and the second voltage V2, the operation may return to S18. In such case, S20 may not be provided.

In another example, electrical connection of the charging device 1 may be checked during at least one of the charge start wait time T1, fast charge start wait time T2, charge end wait time T3, and recharge start wait time T4. In such case, the charge control circuit 2 may be implemented by a plurality of trimming fuse circuits including a timing fuse circuit for checking electrical connection during the charge start wait time T1, a timing fuse circuit for checking electrical connection during the fast charge start wait time T2, a timing fuse circuit for checking electrical connection during the charge end wait time T3, and a timing fuse circuit for checking electrical connection during the recharge start wait time T4. By trimming any combination of the timing fuse circuits during the manufacturing process, the electrical connection may be checked using various checking methods. Similarly, any one of the reference values used by the charge control circuit 2, including the first voltage V1, second voltage V2, third voltage V3, first current i1, second current i2, third current i3, charge start wait time T1, fast charge start wait time T2, charge end wait time T3, and recharge start wait time T4 may be selected by trimming a corresponding trimming fuse circuit during the manufacturing process. In this manner, the charge control circuit 2 may be easily modified according to a desired method of checking electrical connection or a desired method of charging.

As described above referring to any one of FIGS. 1 to 3, electrical connection between the charging device 1 and the secondary battery 6 may be easily checked by using information that may be obtained when the charge control circuit 2 selects the charge mode during any one of the charge start wait time T1, fast charge start wait time T2, charge end wait time T3, and recharge start wait time T4. Accordingly, no additional circuit is required to check the electrical connection, thus the overall space or the overall cost may be made small.

Figure 4:
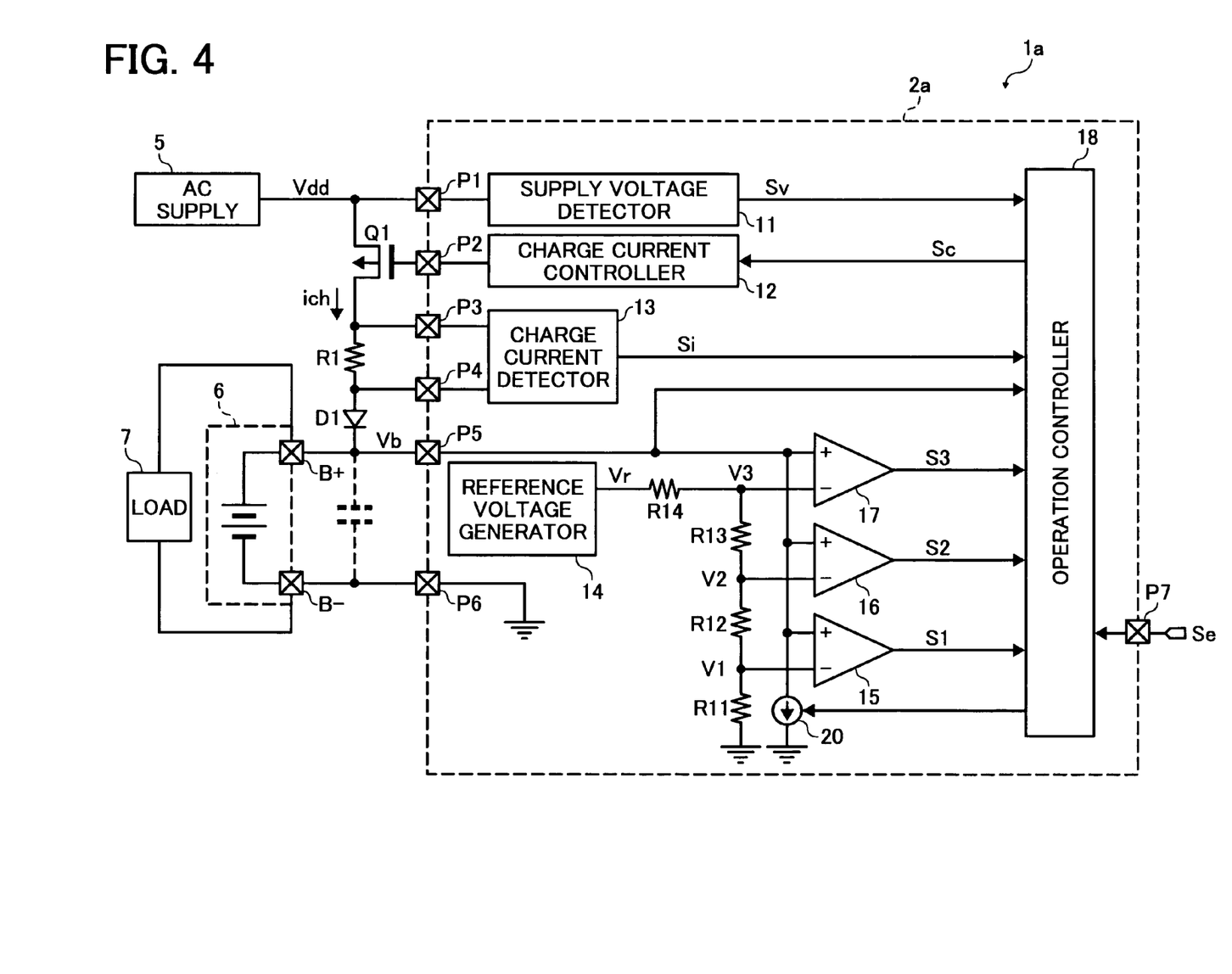
FIG. 4 is a schematic circuit diagram illustrating the structure of a charging device according to an example embodiment of the present invention.

Referring now to FIG. 4, the circuit structure of a charging device 1a is explained according to an example embodiment of the present invention. The charging device 1a includes a charge control circuit 2a, which is substantially similar in structure and function to the charge control circuit 2 of the charging device 1 shown in FIG. 1. The differences include the addition of a current load 20 and an external signal input terminal P7.

The external signal input terminal P7 inputs an external signal Se received from the outside of the charge control circuit 2a to the operation controller 18. In this example, when the external signal Se is output, the load 7 is switched to a sleep mode such that electric consumption of the load 7 is reduced.

The current load 20, which may be implemented by a current supply, is provided between the battery connector terminal P5 and the ground. The current load 20 has a control terminal to which a control signal output from the operation controller 18 is input.

In operation, upon receiving the external signal Se, the operation controller 18 outputs the control signal, which causes the current load 20 to be turned on during the charge start wait time T1, fast charge start wait time T2, and recharge start wait time T4. The current load 20 is turned off during any time other than the above-described wait times T1, T2, and T4.

As illustrated in FIG. 4, the battery connector terminal P5 and the ground terminal P6 are provided adjacent to each other such that stray capacitance may exist at the wiring between the terminals P5 and P6. As a result, the electric charge may be accumulated due to the stray capacitance, thus generating the voltage between the terminals P5 and P6. For this reason, any one of the charge start wait time T1, fast charge start wait time T2, and recharge start wait time T4 may be also used as a time period in which the electric charge, or the voltage, accumulated between the terminals P5 and P6 is discharged. However, when the impedance generated between the battery connector terminal P5 and the ground terminal P6 is relatively high, it may take longer to discharge the electric charge, or the voltage, accumulated between the terminals P5 and P6. In order to facilitate discharging, the current load 20 is turned on during any one of the charge start wait time T1, fast charge start wait time T2, and recharge start wait time T4. In this manner, electrical connection may be checked with the improved accuracy.

The value of the current provided by the current load 20 when the current load 20 is turned on may be set at the time of manufacturing the charge control circuit 2a, for example, based on the impedance, stray capacitance, and/or the time period of any one of the charge start wait time T1, fast charge start wait time T2, and recharge start wait time T4. Alternatively, the value of the current provided by the current load 20 may be selected from the range between 0 A to several mA according to the external signal Se input through the external signal input terminal P7.

Further, the external signal Se may set the reference value of any one of the charge start wait time T1, fast charge start wait time T2, charge end wait time T2, and recharge start wait time T4, the first voltage V1, the second voltage V2, the third voltage V3, the first current i1, the second current i2, and/or the third current i3. Furthermore, the external signal Se may be used to select the method of checking electrical connection. In this manner, the charge control circuit 2 may be applicable to various methods of charging or various methods of checking electrical connection.

Figure 5A:
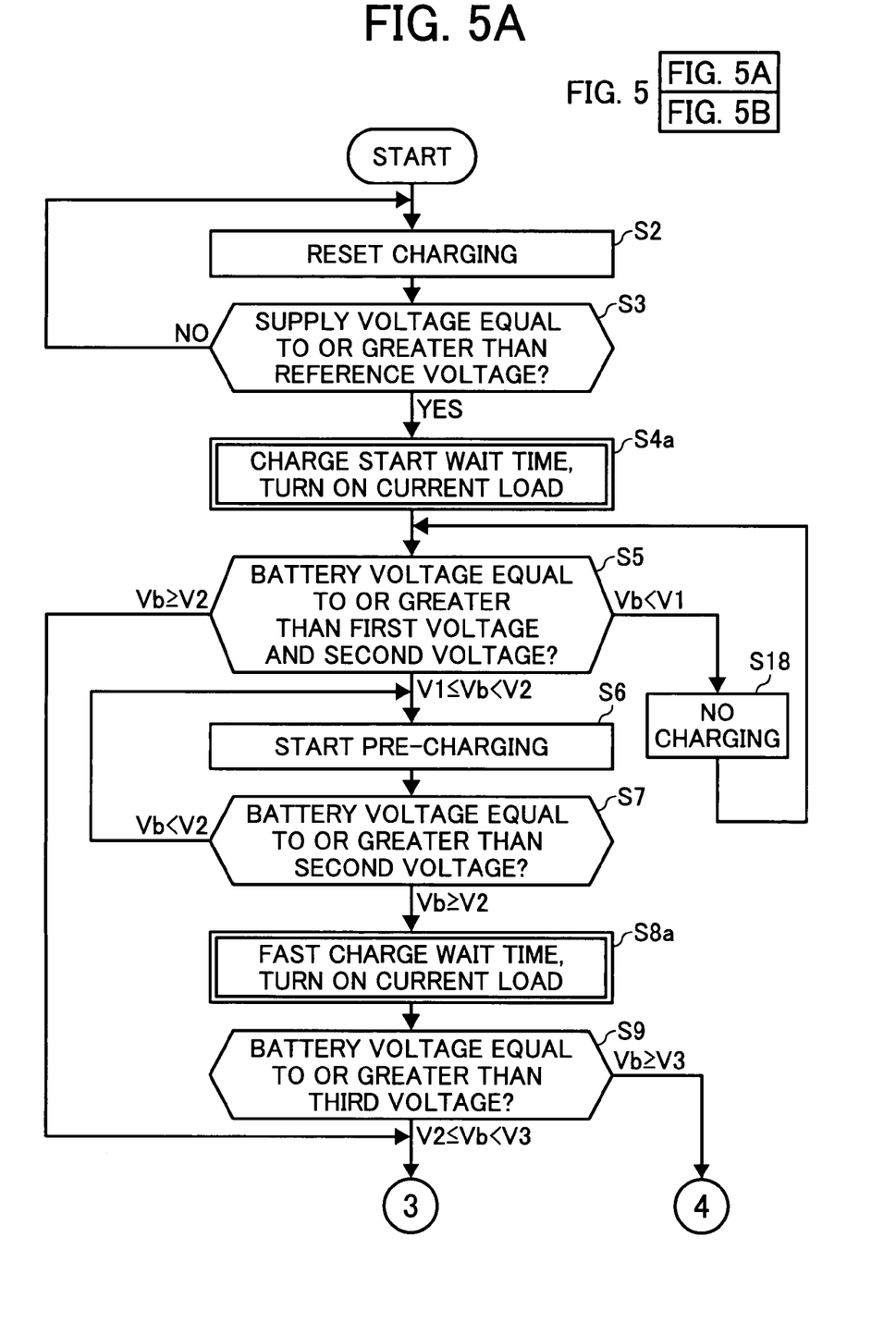
FIGS. 5A and 5B are a flowchart illustrating operation of checking electrical connection between the charging device shown in FIG. 4 and a secondary battery, performed by the charging device shown in FIG. 4, according to an example embodiment of the present invention.
Figure 5B:
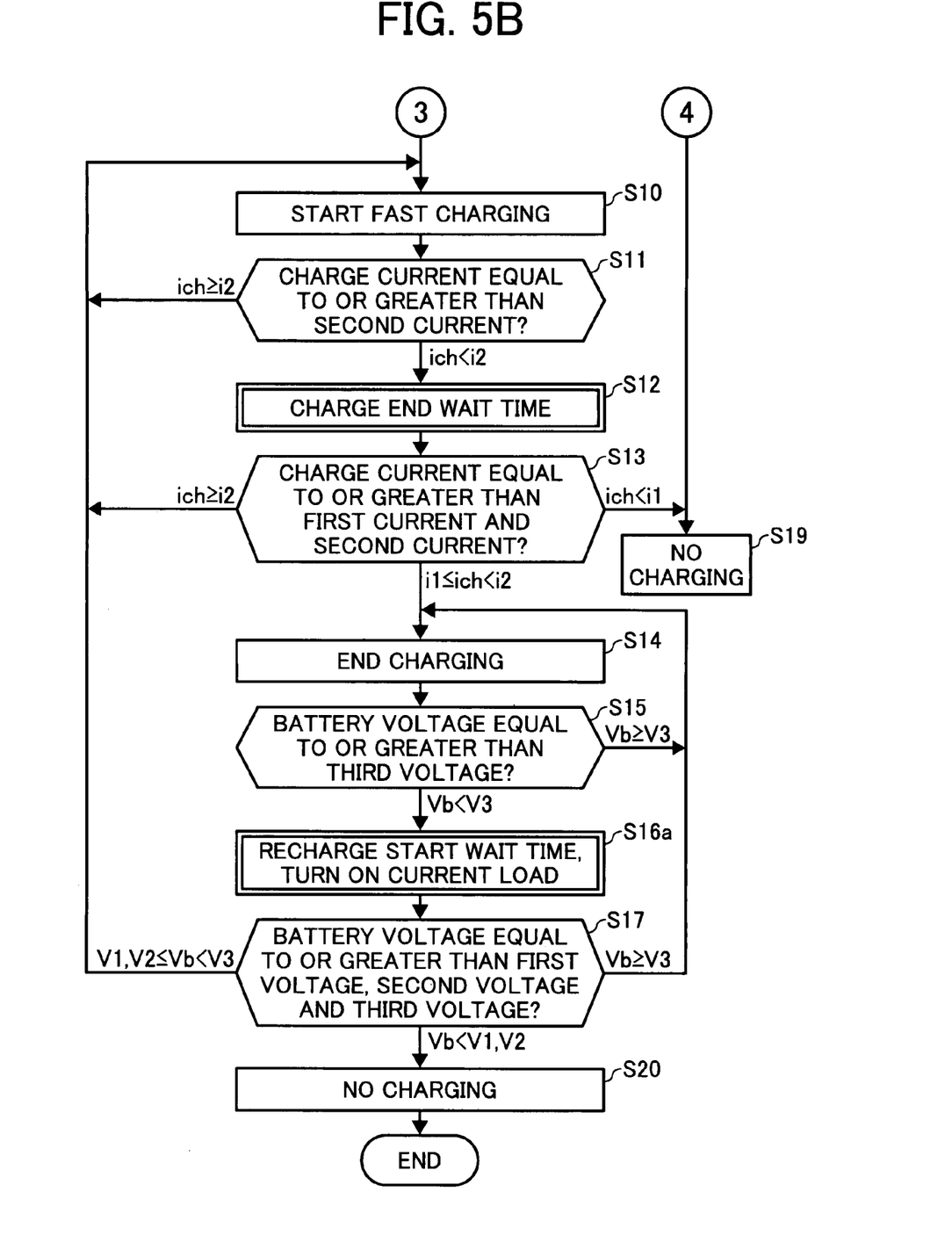

Referring now to FIG. 5, operation of checking electrical connection between the charging device 1a and the secondary battery 6 is explained according to an example embodiment of the present invention. The operation of FIG. 5 is substantially similar to the operation of FIG. 2. The differences include the replacement of S4 with S4a, the replacement of S8 with S8a, and the replacement of S16 with S16a.

At any one of S4a, S8a, and S16a, the operation controller 18 receives the external signal Se through the external signal input terminal P7, and turns on the current load 20.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

The invention claimed is:

1. A charge control circuit for controlling charging operation of a transistor configured to supply a charge current to a secondary battery, the circuit comprising:

a battery connector terminal configured to electrically connect the charge control circuit with the secondary battery;

a charge current detector provided between a drain of the transistor and the secondary battery and configured to detect a value of the charge current supplied from the transistor to the secondary battery;

a voltage comparator coupled to the battery connector terminal and configured to detect a value of a battery voltage at the battery connector terminal and compare the value of the battery voltage with a reference voltage value to generate a comparison result, the reference voltage value comprising a first reference voltage value; and a controller coupled to the battery connector terminal, the charge current detector, and the voltage comparator and configured to turn off the transistor before starting the charging operation, start a charge start wait time after the transistor is turned off while keeping the off state of the transistor, determine whether the value of the battery voltage during the charge start wait time is equal to or greater than the first reference voltage value based on the comparison result to generate a first determination result, and control the on or off state of the transistor after the charge start wait time according to the first determination result, wherein the controller keeps the off state of the transistor after the charge start wait time when the first determination result indicates that the value of the battery voltage during the charge start wait time is less than the first reference voltage value, and the controller turns on the transistor to start the charging operation after the charge start wait time when the first determination result indicates that the value of the battery voltage during the charge start wait time is equal to or greater than the first reference voltage value.

2. The circuit of claim 1, further comprising:

a current load provided between the battery connector terminal and the ground and configured to supply a current when turned on, wherein the controller is further configured to control the on or off state of the current load such that the current load is turned on during the charge start wait time.

3. The circuit of claim 1, wherein the reference voltage value further comprises a second reference voltage value greater than the first reference voltage value, and wherein the controller is further configured to determine whether the value of the battery voltage during the charge start wait time is equal to or greater than the second reference voltage value based on the comparison result to generate a second determination result, and control the value of the charge current during the charging operation performed after the charge start wait time according to the second determination result.

4. The circuit of claim 3, wherein the value of the charge current during the charging operation is set to a first current value when the second determination result indicates that the value of the battery voltage during the charge start wait time is less than the second reference voltage value, and wherein the value of the charge current during the charging operation is set to a second current value greater than the first current value when the second determination result indicates that the value of the battery voltage during the charge start wait time is equal to or greater than the second reference voltage value.

5. The circuit of claim 4, wherein the reference voltage value further comprises a third reference voltage value greater than the second reference voltage value, and wherein the controller is further configured to determine whether the value of the battery voltage reaches the second reference voltage value during the charging operation when the second determination result indicates that the value of the battery voltage during the charge start wait time is less than the second reference voltage value, start a fast charge start wait time after the controller determines that the value of the battery voltage reaches the second reference voltage value, determine whether the value of the battery voltage during the fast charge start wait time is equal to or greater than the third reference voltage value based on the comparison result to generate a third determination result, and control the on or off state of the transistor after the fast charge start wait time according to the third determination result, wherein the controller turns off the transistor after the fast charge start wait time when the third determination result indicates that the value of the battery voltage during the fast charge start wait time is equal to or greater than the third reference voltage value, and the controller changes the value of the charge current from the first current value to the second current value after the fast charge start wait time when the third determination result indicates that the value of the battery voltage during the fast charge start wait time is less than the third reference voltage value.

6. The circuit of claim 5, wherein the controller is further configured to reduce the value of the charge current after the value of the battery voltage reaches the third reference voltage value during the charging operation, start a charge end wait time after the value of the charge current reaches below a reference current value greater than the first current value and less than the second current value, determine whether the value of the charge current during the charge end wait time is equal to or greater than the first current value based on the comparison result to generate a fourth determination result, and control the on or off state of the transistor after the charge end wait time according to the fourth determination result, wherein the controller turns off the transistor after the charge end wait time to stop the charging operation when the fourth determination result indicates that the value of the charge current during the charge end wait time is less than the first current value, and the controller turns off the transistor after the charge end wait time to end the charging operation when the fourth determination result indicates that the value of the charge current during the charge end wait time is equal to or greater than the first current value.

7. The circuit of claim 6, wherein the controller is further configured to start a recharge start wait time before a recharging operation while keeping the off state of the transistor when the value of the battery voltage reaches below the third reference voltage value, determine whether the value of the battery voltage during the recharge start wait time is equal to or greater than at least one of the first reference voltage value and the second reference voltage value based on the comparison result to generate a fifth determination result, and control the on or off state of the transistor after the recharge start wait time according to the fifth determination result, wherein the controller keeps the off state of the transistor after the recharge start wait time when the fifth determination result indicates that the value of the battery voltage during the recharge start wait time is less than the at least one of the first reference voltage value and the second reference voltage value, and the controller turns on the transistor to start the recharging operation after the recharge start wait time when the fifth determination result indicates that the value of the battery voltage during the recharge start wait time is equal to or greater than the at least one of the first reference voltage value and the second reference voltage value.

8. The circuit of claim 7, wherein the at least one of the first reference voltage value and the second reference voltage value is determined based on a rate of the battery voltage obtained during the recharge start wait time.

9. The circuit of claim 7, further comprising:
an external signal input terminal configured to input an external signal to the controller,
wherein the controller is further configured to determine a value of at least one of the charge start wait time, fast charge start wait time, charge end wait time, and recharge start wait time, according to the external signal.

10. The circuit of claim 7, further comprising:
a current load provided between the battery connector terminal and the ground and configured to supply a current when turned on,
wherein the controller is further configured to control the on or off state of the current load such that the current load is turned on during at least one of the charge start wait time, fast charge start wait time, charge end wait time, and recharge start wait time.

11. The circuit of claim 10, further comprising:
an external signal input terminal configured to input an external signal to the controller,
wherein the controller controls the on or off state of the current load according to the external signal.

12. The circuit of claim 11, wherein the controller is further configured to control a value of the current supplied by the current load according to the external signal input by the external signal input.

13. A charging device for charging a secondary battery configured to connect with the charging device, the device comprising:

a transistor configured to supply a charge current to the secondary battery;
a charge control circuit configured to control a charging operation of the transistor while keeping a value of at least one of the charge current and a battery voltage constant, the charge control circuit comprising:
a battery connector terminal configured to electrically connect the charge control circuit with the secondary battery;
a charge current detector provided between a drain of the transistor and the secondary battery and configured to detect the value of the charge current supplied from the transistor to the secondary battery;
a voltage comparator coupled to the battery connector terminal and configured to detect the value of the battery voltage by detecting a voltage at the battery connector terminal and compare the value of the battery voltage with a reference voltage value to generate a comparison result, the reference voltage value comprising a first reference voltage value; and
a controller coupled to the battery connector terminal, the charge current detector, and the voltage comparator and configured to turn off the transistor before starting the charging operation, start a charge start wait time after the transistor is turned off while keeping the off state of the transistor, determine whether the value of the battery voltage during the charge start wait time is equal to or greater than the first reference voltage value based on the comparison result to generate a first determination result, and control the on or off state of the transistor after the charge start wait time according to the first determination result, wherein the controller keeps the off state of the transistor after the charge start wait time when the first determination result indicates that the value of the battery voltage during the charge start wait time is less than the first reference voltage value, and the controller turns on the transistor to start the charging operation after the charge start wait time when the first determination result indicates that the value of the battery voltage during the charge start wait time is equal to or greater than the first reference voltage value.

14. The charging device of claim 13, wherein the charge control circuit further comprises:
a current load provided between the battery connector terminal and the ground and configured to supply a current when turned on,
wherein the controller is further configured to control the on or off state of the current load such that the current load is turned on during the charge start wait time.

15. A method of checking electrical connection between a charging device and a secondary battery, the method comprising:
detecting a value of a charge current supplied from the charging device to the secondary battery;
detecting a value of a battery voltage of the secondary battery at a battery connector terminal provided in the charging device;
obtaining a first comparison result indicating whether the value of the battery voltage is equal to or greater than a first reference voltage value;
obtaining a second comparison result indicating whether the value of the battery voltage is equal to or greater than a second reference voltage value that is greater than the first reference voltage value;

obtaining a third comparison result indicating whether the value of the battery voltage is equal to or greater than a third reference voltage value that is greater than the second reference voltage value;

obtaining a fourth comparison result indicating whether the value of the charge current is equal to or greater than a reference current value;

checking electrical connection between the charging device and the secondary battery during a wait time in which a charge mode of the charging device is changed to generate a checking result, using at least one of the first comparison result, second comparison result, third comparison result, and fourth comparison result, the wait time being at least one of a plurality of wait times comprising:
- a charge start wait time occurred after resetting the charging device to determine whether to change the charge mode from a non-charge mode to at least one of a pre-charge mode and a fast charge mode;
- a fast charge start wait time occurred after the value of the battery voltage reaches the second reference voltage value to determine whether to change the charge mode from the pre-charge mode to the fast charge mode;
- a charge end wait time occurred after the value of the charge current reaches below the reference current value to determine whether to change the charge mode from the fast charge mode to a full charge mode; and
- a recharge start wait time occurred after the value of the battery voltage reaches below the third reference voltage value to determine whether to change the charge mode from the full charge mode to a recharge mode.

16. The method of claim 15, further comprising:

causing the charging device to operate under the charge mode, the charge mode being selected during the wait time from a plurality of charge modes according to at least one of the first comparison result, second comparison result, third comparison result, and fourth comparison result, the plurality of charge modes comprising:
- the pre-charge mode in which the charging device charges the secondary battery by supplying the charge current having a first current value smaller than the reference current value, the pre-charge mode being selected when the first comparison result and the second comparison result indicate that the value of the battery voltage is equal to or greater than the first reference voltage value but less than the second reference voltage value;
- the fast charge mode in which the charging device charges the secondary battery by supplying the charge current having a second current value greater than the reference current value, the fast charge mode being selected when the second comparison result and the third comparison result indicate that the value of the battery voltage is equal to or greater than the second reference voltage value but less than the third reference voltage value;
- the full charge mode in which the charging device keeps the full charge state of the secondary battery without supplying the charge current, the full charge mode being selected when the fourth comparison result indicates that the value of the charge current is below the reference current value; and
- the recharge mode in which the charging device charges the secondary battery by supplying the charge current having the second current value, the recharge mode being selected when the third comparison result indicates that the value of the battery voltage is below the third reference voltage value.

17. The method of claim 15, further comprising:

changing the charge mode of the charging device to the non-charging mode when the checking result indicates that the charging device and the secondary battery is not electrically connected or the secondary battery does not operate normally.

18. The method of claim 17, wherein the checking comprising:

selecting the at least one of the plurality of wait times according to an external signal input to the charging device.

19. The method of claim 17, wherein the wait time has a value determined by an external signal input to the charging device.

20. The method of claim 17, further comprising:

connecting the battery connecter terminal with a current load during at least one of the charge start wait time, fast charge start wait time, and recharge start wait time.

* * * * *